March 11, 1930.  J. A. ANDERSON ET AL  1,749,797
AUTOMATIC AIR CONTROL FOR WATER SUPPLY SYSTEMS
Filed July 16, 1927

INVENTORS
John A. Anderson
William H. Elmes
By Jack R Snyder
Attorney

Patented Mar. 11, 1930

1,749,797

UNITED STATES PATENT OFFICE

JOHN A. ANDERSON, OF PITTSBURGH, PENNSYLVANIA, AND WILLIAM H. ELMES, OF TORONTO, ONTARIO, CANADA

AUTOMATIC AIR CONTROL FOR WATER-SUPPLY SYSTEMS

Application filed July 16, 1927. Serial No. 206,231.

Our invention relates to an automatic air control for water supply systems, of the hydro-pneumatic type, commonly employed for domestic purposes.

When air and water are under pressure, the water very gradually absorbs a portion of the air, thereby permitting the absorbed portion to escape from the pressure tank when water is withdrawn. The air supply must, therefore, be replenished, or the tank will eventually fill with water, thereby reducing the quantity of air and preventing the proper operation of the water system.

The maintenance of the air supply in the tank is a very essential part of the successful operation of a hydro-pneumatic water supply system, and in the water supply systems, now commonly in use, the air is replenished by intermittently operating an air supply pump which necessitates the attention of an operator for starting and stopping the air pump when required.

The primary object of our invention is to provide an air control for hydro-pneumatic water supply systems, which will function automatically to constantly maintain the proper operating volume or quantity of air within the tank of the water system and whereby the water within the tank will also be maintained at a nearly constant level.

Further objects of the invention are to provide a device of the character described which may be readily connected to any type of hydro-pneumatic water supply system already installed, as well as form a component part of a new water supply system; which requires no additional material to effect its installation except that embodied in the invention itself; which is simple in its construction and arrangement, strong, durable and highly efficient in its use, compact, positive in its action, and comparatively inexpensive to manufacture, install, and operate.

In the drawing wherein like numerals of reference designate corresponding parts throughout the several views:—

Figure 1:
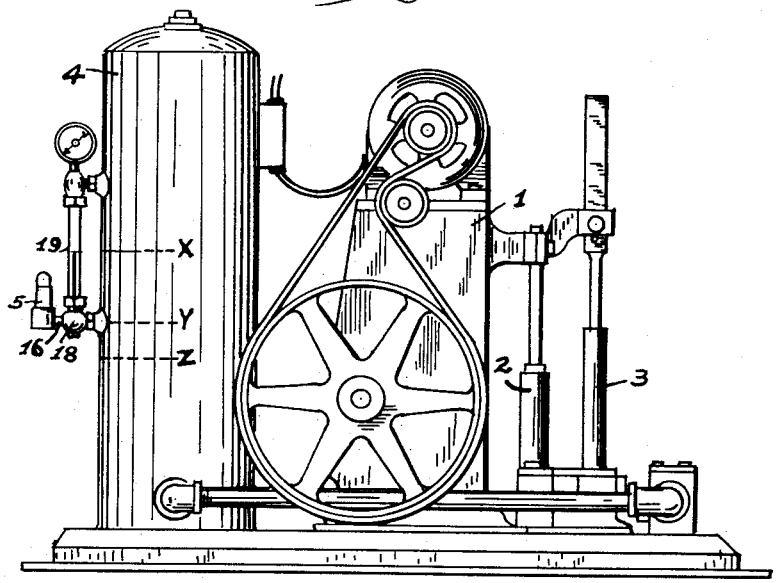
Figure 1 is a side elevational view of a hydro-pneumatic water supply system embodying an automatic air control arranged in accordance with the invention.
Figure 2:
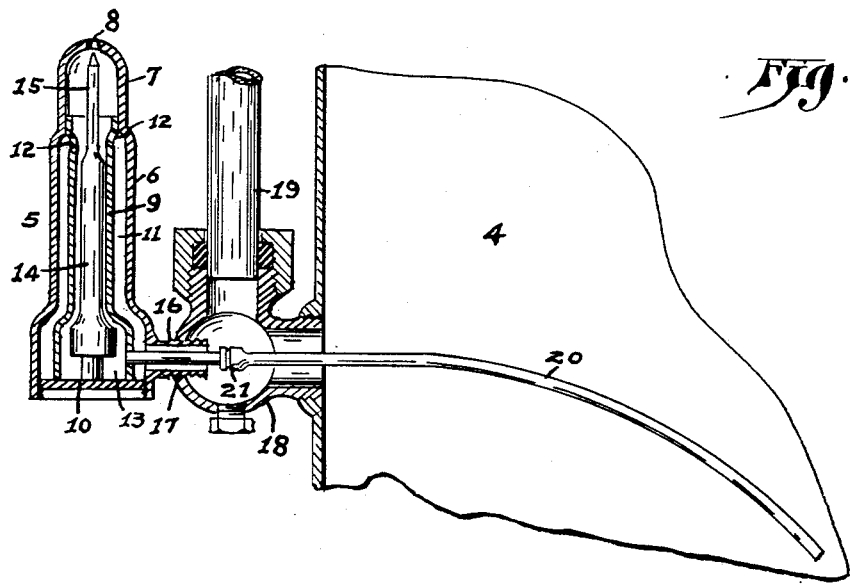
Figure 2 is an enlarged cross-sectional view of the device and of associated parts.

Referring in detail to the drawing Figure 1 illustrates a hydro-pneumatic water supply system, of the usual construction and operation, and which comprises a power mechanism 1 operatively connected with suitable water and air pumps respectively indicated at 2 and 3, and with a pressure tank 4.

The purpose of a hydro-pneumatic water supply system, as now commonly constructed and employed, is to deliver running water under pressure to any place desired, by means of a pump which gathers it from the source of supply and forces it into a closed pressure tank against compressed air. The air in the tank is further compressed by the incoming water and when it reaches a predetermined maximum pressure an automatically operated mechanism functions to suspend the operation of the pump. The water may then be withdrawn from the tank, causing the expansion of the air and consequently reducing its pressure. When the pressure is reduced to a predetermined minimum the automatically operated mechanism functions to operate the pump to replace the water that has been withdrawn.

When compressed air and water are carried together in the same tank, the water absorbs a portion of the air and expels it each time water is drawn from the tank. As the withdrawal of water from the tank is usually a frequent occurrence, the air supply in the tank will gradually diminish and eventually prevent the proper operation of the water supply system.

In the ordinary type of water supply systems, an air pump is provided, which is started and stopped manually to replenish the quantity of air lost by its absorption by the water and expelled from the pressure tank, in the manner above stated.

Owing to varying conditions found in practice, it is impossible to equip a water supply system, of the type stated, with an air pump which operates simultaneously with the water pump to develop and provide exactly the amount of air required to replace the air dissipated through its absorption and expulsion with the water withdrawn from the pressure tank.

The present invention provides an automatic air control which will function to maintain a constant volume or quantity of air in the pressure tank 4 by the synchronous operation of the air pump 3 with the water pump 2.

The embodiment of the invention, illustrated in the drawings, comprises an air valve 5, through which all excess air is automatically vented from the tank 4.

The air valve 5 consists of an outer casing 6 having a reduced upper portion 7, which is closed at its top with the exception of the air vent 8. An inner casing 9 is mounted in the outer casing 6 and has its upper end frictionally engaged in the reduced upper portion 7 of the outer casing 6. The lower end of the inner casing 9 is seated on the bottom 10, which is threadedly connected in the lower end of the outer casing 6.

The inner casing 9 is spaced from the outer casing 6 providing an air chamber 11 which communicates with the interior of the inner casing 9 or valve chamber 13 by means of a plurality of ports 12 formed adjacent to the upper end of said inner casing 9.

A valve float 14 is mounted for vertical movement in the valve chamber 13 and carries a valve pin 15 at its upper end, which is adapted to seat in the air vent 8 for closing the latter for the purpose and in the manner to be described.

The lower end of the outer casing 6 is provided with a laterally disposed attaching nipple 16 which is threadedly engaged in an aperture 17 provided therefor in the lower fitting 18 of the pressure tank water gauge 19.

A siphon tube 20 provided with a swivelled joint 21, is communicably connected to the inner valve casing 9 and extends through the nipple 16 and through the water gauge fitting 18. The free end of the siphon tube 20 is curved downwardly and depends into the pressure tank 4 a distance below the lower end of the water gauge 19.

In practice the operation of our improved automatic air control is as follows:—

Assuming, that for maximum efficiency it is desirable to have the water level in pressure tank 4 stand at the level indicated at X, at maximum pressure. The water and air pumps 2 and 3 have respectively furnished water and air and have stopped operating at this point. Water is now withdrawn from the tank 4 and lowers the water level to the level indicated at Z. As the water level recedes and passes level indicated at Y and below the water gauge fitting 18, air passes through the nipple 16, up through the air chamber 11, through ports 12, and on top of the water in inner chamber 13, allowing the water to siphon out through the tube 20. This lowers the float 14 and allows the air to pass out through the air vent 8.

Air continues to pass out through the air vent 8 during the lowering of the water level from the level Y, until the combined escape of air and the withdrawal of water has reduced the pressure to a predetermined minimum point, when water and air pumps 2 and 3 automatically start. Air continues to pass out through the air vent 8 until the water level rises up in the siphon tube 20, raising float 14, which closes the air vent 8, thereby preventing the escape of air or water.

In short, the function of this device is to allow the escape of air while water recedes from level Y to level Z, and also during the rising of the water level from level Z to level Y. The amount of air passing out of the air vent 8, during this time, is approximately the same amount that the air pump 3 will deliver during the next operating period, less the amount of air absorbed by the outgoing water.

From the above description, it will be seen that if some exceptional condition occurs, and the tank 4 is found to contain too much air or too much water for its efficient operation, the device will automatically rectify the inefficiency. In the former case, by releasing considerable air through the air vent 8 when the water level is low, and in the latter case, by permitting only water to be drawn and the air retained until such time that the air replenishing device has replaced the proper amount of air.

It will, of course, be obvious that while the provision of the siphon tube 19, for the purpose described, will appreciably enhance the efficiency of our automatic air control, it is not essential to successful performance of the device. Further, it is to be understood that any other type of automatically operable air valve may be employed, and that the said valve may be communicably attached to the pressure tank 4, in any suitable manner and in any suitable position other than its connection with the water gauge fitting 17, as herein illustrated and described.

From the foregoing description taken in connection with the accompanying drawing, the principle of the construction and the method of operation will be readily apparent to those skilled in the art to which the invention appertains, and while describing the illustrated embodiment of the invention, it is to be understood that the device shown in the drawing is merely illustrative, and that various changes in the form, proportion and details of construction may be resorted to without departing from the principle or sacrificing any advantages of the invention, which come within the scope of the claim hereunto appended.

What we claim is:

In combination, an automatic air control for a water supply system of the character described including a pressure tank, comprising an air valve consisting of an outer casing having its lower end communicably connected with said pressure tank, said outer casing having a reduced upper end provided with an air vent at the top thereof, an inner casing providing a valve chamber and mounted in said outer casing, said inner casing having an open upper end fixed in said reduced portion of said outer casing, said outer casing having a removable bottom constituting a bottom for said valve chamber, said inner casing being formed with a plurality of air ports which are disposed adjacent to the upper end thereof and establishing communication between said outer casing and said valve chamber, a valve float mounted for vertical movement in said valve chamber, a valve pin carried at the upper end of said valve float and adapted for seating in said air vent for closing the latter, and a siphon tube having one end thereof connected with the lower end of said inner casing and communicating with said valve chamber, said siphon tube extending into the pressure tank and having the free end thereof disposed below the plane of its connection with the lower end of said inner casing.

In testimony whereof we affix our signatures.

JOHN A. ANDERSON.
WILLIAM H. ELMES.